Dec. 10, 1968   J. D. PAGE   3,415,050

SPINDLE DRIVE AND STOP MECHANISM

Filed Jan. 13, 1967

United States Patent Office 3,415,050
Patented Dec. 10, 1968

3,415,050
SPINDLE DRIVE AND STOP MECHANISM
John Douglas Page, Clemson, S.C., assignor to Maremont
Corporation, Chicago, Ill., a corporation of Illinois
Filed Jan. 13, 1967, Ser. No. 609,225
5 Claims. (Cl. 57—88)

ABSTRACT OF THE DISCLOSURE

An electro-magnetic drive and stop mechanism adapted for driving and stopping a textile spinning or twisting spindle blade, including a clutch plate connected to drive the blade and adapted to be engaged alternatively with a driving whirl or an electrically activated friction brake which has a rubber sleeve interposed between the spring blade and the clutch plate providing a positive but distortable connector for positioning the clutch plate alternatively in driving engagement with the whirl friction drive surface on the friction brake. In one embodiment, the clutch plate is spring biased to maintain the clutch plate in driving engagement with the whirl. In a second embodiment, the rubber sleeve is initially distorted to maintain the clutch plate in driving engagement with the whirl, and the spring is omitted.

---

The present invention relates to a textile spindle having an improved electro-magnetic clutch and brake assembly.

In textile spinning and twisting spindles and the like, an electro-magnetic clutch and brake assembly is frequently utilized for driving the spindle blade or for braking it to a stop. With such arrangement, the blade is rotatably driven from a continuously driven whirl through a clutch plate which is moved axially along the spindle blade in one direction frictionally to engage the clutch plate with the continuously driven whirl and is moved in an opposite direction to engage the clutch plate alternatively with a stationary braking surface. To provide for such axial movement, the clutch plate has ordinarily been connected to the driven blade by means of a spline which permits axial shifting movement of the clutch plate to the axially displaced alternative driving and braking positions. Such a spline connection, however, although widely used, is highly susceptible to wear, particularly that occurring as a result of fretting corrosion, to the extent that the spindle blade does not run true and so tends to cause yarn breakage. Also, manufacture of suitably accurate splines for use in modern high speed spindles is difficult and expensive, aside from their inherent wear problem.

Accordingly, it is a principal object of the invention to eliminate the spline wear problem by providing a positive connection between the spindle blade and clutch plate.

It is another object of the invention to provide a connection between the electro-magnetic clutch plate and the blade which will act as a barrier to residual and stray magnetic paths.

It is still another object of the invention to provide a connection between the clutch plate and blade which is automatically self-aligning, well adapted to provide a smoother and more efficient operation of the clutch and brake mechanism, and is much more simple and accurate to manufacture than heretofore known connections.

These and other objects have been provided according to the invention by the utilization of an axially distortable, resilient connecting element capable of assuming alternative driving and braking positions for driving and for stopping the blade without the intervention of a spline or other movable connector.

With the above and other objects in view as may hereinafter appear, the several features of the invention consist in the devices, combinations, and arrangements of parts hereinafter described and claimed, which, together with the advantages to be obtained thereby, will be readily understood by one skilled in the art from the following description of a preferred embodiment thereof taken in connection with the accompanying drawing, in which:

Figure 1:
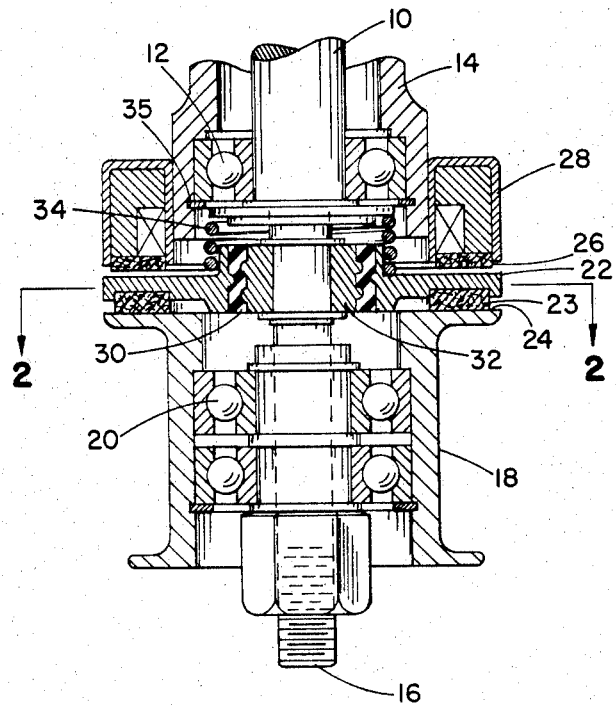
FIG. 1 is a somewhat fragmentary view of a spinning spindle including a blade connected to be driven from a continuously rotated whirl through an electro-magnetic clutch and brake mechanism which includes a positive but axially distortable operating connection between the clutch plate and driven blade.
Figure 2:
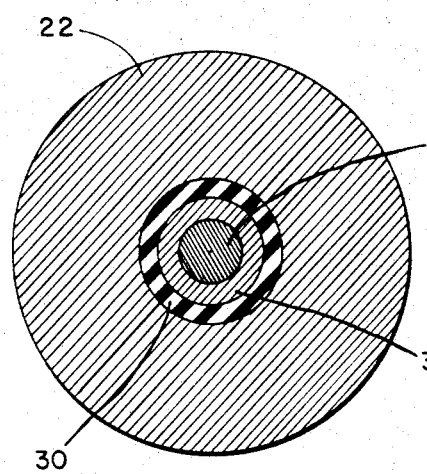
FIG. 2 is a sectional plan view taken on a line 2—2 of FIG. 1.

The invention is herein disclosed as embodied in an electro-magnetic clutch and brake mechanism for a spinning spindle assembly which comprises generally a spindle blade 10 rotatably mounted in ball bearings of which one is shown at 12 within a sleeve housing 14. A downwardly extending shaft extension 16 of the blade 10 carries a whirl 18 which is mounted on ball bearings 20 and is continuously driven by a belt, not specifically shown. The blade 10 is driven from the whirl 18 by means of a clutch and brake mechanism which includes a clutch plate 22 which is attached to the blade 10 and carries a friction element 23 for frictional engagement with a cooperating friction surface 24 on the upper face of the whirl 18, or alternatively with an electro-magnetically controlled friction braking member 26. The electro-magnets for supplying the required electro-magnetic braking torque are generally indicated at 28 attached to the sleeve housing 14. The general arrangement of the spindle blade 10, whirl 18, electro-magnetic brake 28 and clutch plate 22, as thus far described, is in accordance with the prior art.

The improvement which forms the subject matter of the invention consists in the provision of a positive but distortable connector between the clutch plate 22 and spindle blade 10, which replaces the usual shiftable spline connector between these parts. The improved connector comprises a rubber sleeve 30 which is interposed between and bonded to a sleeve hub 32 of the clutch plate 22 fixed on blade 10 and to the more outwardly extending disc portion of said plate 22. The rubber sleeve 30 provides a positive connector between the clutch plate 22 and blade 10 causing the blade to be rotated at all times with the clutch plate, but is axially distortable allowing the clutch plate to be moved axially into clutching engagement with the clutch face of the continuously rotated whirl 10, or alternatively into engagement with the friction braking surface 26.

In the embodiment of FIG. 1 a coiled compression spring 34 interposed between the upper side of the clutch plate 22 and a washer 35 at the lower end of bearing 12 biases the friction member 23 of clutch plate 22 normally downwardly against the friction driving surface 24 of the whirl 18. The energizing of the electro-magnets 28 acts to draw the clutch plate 22 upwardly against the bias of the spring 34 into engagement with the friction braking surface 26 to release the clutch and to apply the brake.

Figure 3:
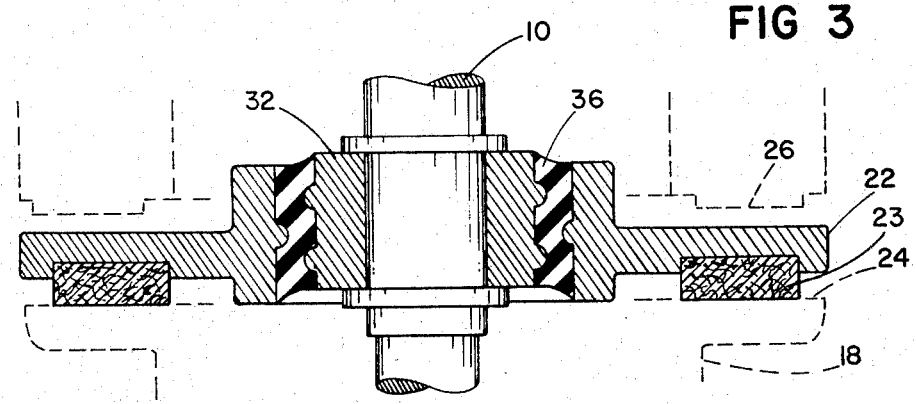
FIG. 3 is a fragmentary view with parts sectioned, similar to FIG. 1 but on a larger scale, illustrating a positive operating connection between the clutch and blade which is normally biased to the clutch engaging position, the biasing spring of FIG. 1 having been omitted.

FIG. 3 illustrates a modification of the invention in which the rubber sleeve, here designated as 36, is prestressed downwardly under sufficient pressure so that the clutch plate 22 is maintained thereby in driving engagement with the clutch face 24 of the whirl 18. Activation of the electro-magnets 28 moves the clutch plate 22 against the bias of the rubber sleeve 36 to a friction braking position in engagement with the friction braking member 26. In this embodiment of the invention, the compression spring 34 is omitted.

It will be understood that the connector employed between the clutch plate 22 and the blade 10 driven thereby is a critical element of the spindle blade drive and brake assembly. The movable spline connector normally employed must be carefully made with accurately determined tolerances. The life of such a spline connection is substantially reduced by wear and fretting, and, additionally, provides paths for residual and stray magnetism. The improved construction herein described in which the spline has been replaced by a rubber sleeve has the advantage that all relatively moving surfaces are eliminated, ensuring a smoother and more efficient operation of the clutch and brake mechanism. Any tendency of the rubber sleeve, replacing the sliding spline connector, to wear or fret is eliminated, and a definite barrier is provided against the setting up of any residual or stray magnetic paths through the spinning blade clutch and brake assembly.

The invention having been described, what is claimed is:

1. In a magnetic driving and stopping mechanism which includes a rotary driven element, a coaxially arranged continuously rotated driving element, a relatively stationary coaxially arranged magnetically activated braking element, and a clutch plate interposed between said driving element and said braking element for frictional engagement alternatively with said driving and magnetically activated braking elements, the combination of a sleeve of resilient material interposed between and positively attached to each of said driven element and clutch plate, providing a rotationally positive and axially distortable connector between said driven element and clutch plate, said clutch plate being normally biased into frictional engagement with said driving element.

2. The combination of claim 1 in which the sleeve of resilient material is a rubber sleeve, interposed between, and attached to the driven element and clutch plate.

3. The combination of claim 2 in which a coiled spring biases the clutch plate normally into engagement with the driving element.

4. The combination of claim 2 in which the rubber sleeve is pre-stressed to maintain the clutch plate normally in engagement with the driving element.

5. An electro-magnetic driving and stopping mechanism for a spinning spindle having, in combination, a blade, a whirl, a relatively stationary coaxially arranged electro-magnetic braking element, a clutch plate interposed between the whirl and the electro-magnetic braking element for frictional engagement alternatively with said whirl and with said electro-magnetic braking element, and a rubber sleeve interposed between and positively attached to each of said spinning blade and said clutch plate, said clutch plate being normally biased into frictional engagement with said whirl.

References Cited

UNITED STATES PATENTS

| | | | |
|---|---|---|---|
| 2,088,979 | 8/1937 | Stanley | 192—68 |
| 2,105,188 | 1/1938 | Guy | 192—68 |
| 2,234,443 | 3/1941 | Macbeth | 192—68 |
| 2,479,168 | 8/1949 | Keene et al. | 57—130 |
| 2,485,959 | 10/1949 | Davies | 57—130 |
| 2,803,106 | 8/1957 | Lindemann | 57—88 |
| 2,873,010 | 2/1959 | Alma. | |
| 3,265,172 | 8/1966 | Atsumi et al. | |
| 3,333,408 | 8/1967 | Keyser | 57—130 XR |
| 3,364,670 | 1/1968 | Stiepel et al. | 57—88 |

FRANK J. COHEN, *Primary Examiner.*

DONALD E. WATKINS, *Assistant Examiner.*

U.S. Cl. X.R.

57—130; 192—48